(12) United States Patent
Sakata et al.

(10) Patent No.: US 8,083,537 B2
(45) Date of Patent: Dec. 27, 2011

(54) GROUNDING WIRE CONNECTION DEVICE

(75) Inventors: Tsutomu Sakata, Yokkaichi (JP); Katsuji Suzuura, Toyota (JP)

(73) Assignees: Sumitomo Wiring Systems, Ltd., Mie (JP); Toyota Motor Corporation, Toyota (JP)

( * ) Notice: Subject to any disclaimer, the term of this patent is extended or adjusted under 35 U.S.C. 154(b) by 59 days.

(21) Appl. No.: 12/810,358

(22) PCT Filed: Nov. 27, 2008

(86) PCT No.: PCT/JP2008/071510
§ 371 (c)(1),
(2), (4) Date: Jun. 24, 2010

(87) PCT Pub. No.: WO2009/084351
PCT Pub. Date: Jul. 9, 2009

(65) Prior Publication Data
US 2010/0279538 A1 Nov. 4, 2010

(30) Foreign Application Priority Data

Dec. 28, 2007 (JP) .................................. 2007-340576

(51) Int. Cl.
*H01R 4/24* (2006.01)
*H01R 4/26* (2006.01)
*H01R 11/20* (2006.01)

(52) U.S. Cl. .......................... 439/395; 439/425; 174/78

(58) Field of Classification Search .................. 439/395, 439/387, 425, 426, 95, 400; 174/78, 197, 174/191
See application file for complete search history.

(56) References Cited

U.S. PATENT DOCUMENTS

| | | | | |
|---|---|---|---|---|
| 3,122,604 A | * | 2/1964 | Cook et al. | 174/51 |
| 3,168,615 A | * | 2/1965 | Owen et al. | 174/84 C |
| 5,164,545 A | * | 11/1992 | Kreinberg et al. | 174/94 R |
| 5,451,167 A | * | 9/1995 | Zielinski et al. | 439/92 |

FOREIGN PATENT DOCUMENTS

| | | |
|---|---|---|
| JP | U-63-117225 | 7/1988 |
| JP | U-63-128773 | 8/1988 |
| JP | U-64-30628 | 2/1989 |
| JP | U-7-10672 | 2/1995 |
| JP | A-11-264427 | 9/1999 |
| JP | A-2002-15789 | 1/2002 |
| JP | A-2005-117725 | 4/2005 |

OTHER PUBLICATIONS

International Search Report dated Jan. 6, 2009 in International Patent Application No. PCT/JP2008/071510.

* cited by examiner

*Primary Examiner* — Hae Moon Hyeon
(74) *Attorney, Agent, or Firm* — Oliff & Berridge, PLC

(57) ABSTRACT

A ground connector comprises facing pieces one ends of which are interconnected via a connecting section, a pair of holding pieces formed by folding back the other ends defining an opening into the space defined by the facing pieces, a displacement section connected between the internal surfaces if the facing pieces and forming a V shape projecting toward the opening, and a piercing piece. A ground wire is inserted into a ground-wire insertion space, the ground connector is attached to an end edge of a vehicle body panel through the opening, the insertion force of the vehicle body panel causes the vehicle body panel to push the displacement section toward the connecting section thus to reverse the projection of the displacement section toward the connecting section and the piercing piece pierces the insulation cover of the ground wire to come into contact with the conductor of the ground wire.

4 Claims, 5 Drawing Sheets

[Prior Art]

GROUNDING WIRE CONNECTION DEVICE

TECHNICAL FIELD

The present invention relates to a grounding wire connection device and more particularly to a grounding wire connection device for connecting a grounding wire provided on a wire harness wired on a vehicle to a vehicle body.

BACKGROUND ART

As shown in FIG. 5, this kind of the operation of connecting the grounding wire to the vehicle body is performed by connecting a grounding terminal 1 to a terminal of a grounding wire w by means of contact bonding, forming a bolt-fixing hole 2a through a vehicle body 2 at a predetermined position thereof, and tightly securing a nut 3 to a rear surface of the vehicle body 2 along the bolt-fixing hole 2a. With a round hole 1b of an annular electrical contact portion 1a in coincidence with the bolt-fixing hole 2a, a bolt 4 is penetrated through the round hole 1b and the bolt-fixing hole 2a and tightened into the nut 3 to fix the grounding terminal 1. Thereafter the grounding terminal 1 is brought into contact with the vehicle body 2 under pressure to connect the grounding terminal 1 to the vehicle body 2.

In the grounding wire connection operation to be performed by using the grounding terminal 1, it is necessary to perform an operation of forming the bolt-fixing hole 2a through the vehicle body 2, an operation of stripping an insulating sheath at the terminal of the grounding wire w, and an operation of crimping the grounding terminal 1 to a core wire exposed portion at the terminal of the grounding wire w. In connecting the grounding wire w to the vehicle body 2, it is necessary to perform an operation of fixing the grounding terminal 1 to the vehicle body 2 with the bolt 4 and the nut 3. Thus the above-described way of connecting the grounding wire w to the vehicle body 2 has a problem that it is necessary to use a large number of parts, and in addition the above-described operation takes much time and labor.

One vehicle has 10 to 30 connection portions on average and in addition has a large number of portions where apparatuses are fixed to the vehicle body with bolts. In some types of vehicles, the sum of the number of these portions to be fixed to the vehicle body with the bolts is nearly 1000. Thus from a viewpoint of work efficiency, there is strong demand for decreasing the number of bolt-tightening operations.

On this problem, the present applicant proposed the grounding wire connection construction which eliminates the need for performing the bolt-tightening operation in an earlier application, as disclosed in Japanese Patent Applications Laid-Open No. 2002-15789 (patent document 1). In detail, as shown in FIG. 6, the male terminal 5 is connected to the terminal of the grounding wire w. The grounding wire connection device 6 having the box part 6a in which the inserted male terminal 5 is locked with the male terminal 5 in contact with the box part 6a and the clip part 6b projected from the outer surface of the box part 6a is formed by integrally molding a highly conductive resin. By inserting the male terminal 5 into the box part 6a and locking it thereto, and inserting the clip part 6b into the locking hole 7a of the vehicle body 7 and locking it thereto, the grounding wire w is connected to the vehicle body 7.

The use of the grounding wire connection device 6 eliminates the need for performing the bolt-tightening operation and in addition the use of bolts and nuts, thus decreasing the number of parts. But the grounding wire connection construction still necessitates the operation of stripping the terminal of the grounding wire w and the terminal-crimping operation to be performed and in addition the locking hole to be formed on the vehicle body. Thus there is room for improvement.

Patent document 1: Japanese Patent Applications Laid-Open No. 2002-15789

DISCLOSURE OF THE INVENTION

Problem to be Solved by the Invention

The present invention has been made in view of the above-described problem. It is an object of the present invention to provide a grounding wire connection device which eliminates the need for performing a bolt-tightening operation to achieve an efficient operation in a vehicle assembly line and eliminates the need for performing an operation of stripping an insulating sheath of the grounding wire and a terminal-crimping operation to achieve an efficient operation in a wire harness assembly line.

Means for Solving the Problem

To solve the above-described problem, the present invention provides a grounding wire connection device for grounding a grounding wire provided on a wire harness wired in a vehicle to a vehicle body panel, the grounding wire connection device being formed integrally by molding a conductive resin, comprising: a pair of opposed pieces; a connection portion formed by connecting ends of the opposed pieces at one side thereof to each other; a pair of sandwiching pieces formed by inward bending and folding the opposed pieces at an open side disposed at the other side of the opposed pieces from ends of the opposed pieces; a displacement portion which is flexible and disposed at a side of the connection portion with respect to a position of the sandwiching pieces by projecting the displacement portion in a shape of V from a pair of the opposed pieces toward the open side, with the displacement portion connecting inner surfaces of a pair of the opposed pieces to each other; a piercing portion projected from a central projected portion of the displacement portion toward the connection portion; and a grounding wire insertion space formed between the piercing portion and the connection portion, wherein the grounding wire is inserted through the grounding wire insertion space; the grounding wire connection device is mounted on the vehicle body panel by attaching the grounding wire connection device on an edge of the vehicle body panel from the open side thereof and bringing a pair of the sandwiching pieces into contact with upper and lower sides of the vehicle body panel respectively; the displacement portion projected in the shape of V is pressed to displace the displacement portion in such a way that the displacement portion is inverted and projected toward the connection portion by means of an insertion force of the vehicle body panel; and the piercing portion projected from the displacement portion penetrates through an insulating sheath of the grounding wire and contacts a core wire thereof.

The present invention also provides a grounding wire connection device for connecting a grounding wire provided on a wire harness wired in a vehicle to a vehicle body panel, the grounding wire connection device being formed integrally by molding a conductive resin, comprising: a pair of opposed pieces; a connection portion formed by connecting ends of the opposed pieces at one side thereof to each other; a pair of sandwiching pieces formed by inward bending and folding the opposed pieces at an open side disposed at the other side of the opposed pieces from ends of the opposed pieces; a displacement portion which is flexible and disposed at a side of the connection portion with respect to a position of the sandwiching pieces by projecting the displacement portion in a shape of V from a pair of the opposed pieces toward the open side, with the displacement portion connecting inner surfaces of a pair of the opposed pieces to each other; a insulation displacement blade portion projected from a central projected portion of the displacement portion toward the connection portion; and a grounding wire insertion space formed between the insulation displacement blade portion and the connection portion, wherein the grounding wire is inserted through the grounding wire insertion space; the grounding wire connection device is mounted on the vehicle body panel by attaching the grounding wire connection device on an edge of the vehicle body panel from the open side thereof and bringing a pair of the sandwiching pieces into contact with upper and lower sides of the vehicle body panel respectively; the displacement portion projected in the shape of V is pressed to displace the displacement portion in such a way that the displacement portion is inverted and projected toward the connection portion by means of an insertion force of the vehicle body panel; and the insulation displacement blade portion projected from the displacement portion cuts an insulating sheath of the grounding wire and contacts a core wire thereof.

As described above, by using the grounding wire connection device having the above-described construction, the conduction between the grounding wire connection device and the vehicle body panel can be obtained by inserting a pair of the opposed pieces into the edge of the vehicle body panel and bringing the sandwiching pieces into contact with the vehicle body panel. The conduction between the grounding wire connection device and the grounding wire can be obtained by inverting the V-shaped projected direction of the displacement piece by means of an insertion force of the vehicle body panel at the time when the grounding wire connection device and the vehicle body panel are conductively brought into contact with each other so that the piercing portion or the insulation displacement blade portion are pressed against the surface of the insulating sheath of the grounding wire and breaks the insulating sheath and contacts the core wire of the grounding wire. Therefore it is unnecessary to perform hitherto required operation of stripping an insulating sheath of the grounding wire and terminal-crimping operation and in addition bolt-tightening and bolt hole-forming operations for fixing the grounding wire to the vehicle body. Further by performing a simple one-touch operation, it is possible to simultaneously complete the conductive contact between the grounding wire connection device and the grounding wire and between the grounding wire connection device and the vehicle body panel. Therefore it is possible to achieve operation efficiency in the wire harness assembly line and a vehicle assembly line.

In addition because the use of bolts and nuts which is hitherto required is unnecessary, it is possible to decrease the number of parts and produce the wire harness at a low cost and make the wire harness lightweight.

The grounding wire is bundled together with a group of electric wires of the wire harness. An intermediate portion of the grounding wire is exposed to the outside by forming a gap between the grounding wire and a peripheral surface of the wire harness. The grounding wire is held by the wire harness in advance by inserting the intermediate portion thereof through the grounding wire insertion space.

Thereby it is possible to draw out the grounding wire from any necessary position of the wire harness and connect any necessary position of the grounding wire to the vehicle body.

Therefore the grounding wire connection device of the present invention enhances the degree of freedom in design to a higher extent and decreases the length of the grounding wire to a higher extent than the grounding wire connection device of the prior art in which the grounding wire is drawn out of the terminal of the wire harness, and the grounding terminal connected to the terminal of the grounding wire is connected to the vehicle body.

As the conductive resin which is a material of the grounding wire connection device, polyacetylene, polyaniline, polypyrrole, and polythiophene are listed. These conductive resins are molded into the above-described configurations by injection molding or the like.

Effect of the Invention

As described above, according to the present invention, the grounding wire connection device is produced by molding the conductive resin. The conduction between the grounding wire connection device and the vehicle body panel is obtained by inserting a pair of the opposed pieces into the edge of the vehicle body panel and bringing the sandwiching pieces into contact with the panel. The conduction between the grounding wire connection device and the grounding wire is obtained by inverting the projected direction of the displacement piece by means of the insertion force of the vehicle body panel so that the piercing portion or the insulation displacement blade portion is pressed against the surface of the insulating sheath of the grounding wire and breaks the insulating sheath and contacts the core wire of the grounding wire.

Therefore it is unnecessary to perform the hitherto required operation of stripping the insulating sheath of the grounding wire and terminal-crimping operation and in addition the operation of fixing the grounding wire to the vehicle body with bolts and nuts. Further by performing the simple one-touch operation, it is possible to simultaneously complete the conductive contact between the grounding wire connection device and the vehicle body panel and between the grounding wire connection device and the grounding wire. Therefore it is possible to achieve operation efficiency in the wire harness assembly line and the vehicle assembly line. Particularly the grounding wire connection device of the present invention has an advantage of eliminating the need for performing the operation of tightening bolts into the vehicle body.

In addition because the use of bolts and nuts is unnecessary, it is possible to decrease the number of parts and produce the wire harness at a low cost and make the wire harness lightweight.

Further because the grounding wire connection position can be set at any desired necessary position of the grounding wire and the wire harness, it is possible to enhance the degree of freedom in design and shorten the length of the grounding wire.

EXPLANATION OF REFERENCE SYMBOLS AND NUMERALS

Figure 1A:
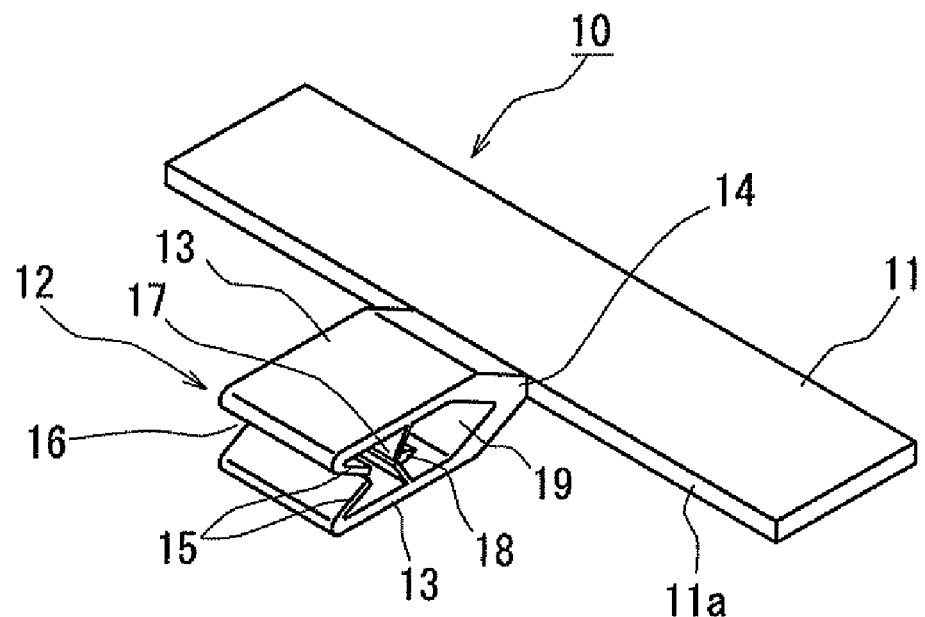
FIG. 1 shows a grounding wire connection device of a first embodiment of the present invention, in which (A) is a perspective view, and (B) is a front view.

10: grounding wire connection device
11: wire harness holding plate part
12: grounding wire connection part
13: opposed pieces
14: connection portion
15: sandwiching pieces
16: open portion
17: displacement portion
18: piercing portion
19: grounding wire insertion space
30: wire harness
32: grounding wire
36: vehicle body panel

BEST MODE FOR CARRYING OUT THE INVENTION

The embodiments of the present invention are described below with reference to drawings.

In each embodiment, the present invention is applied to a grounding wire connection device for connecting a grounding wire 32 set on a wire harness 30 wired inside a vehicle to a vehicle body panel 36.

FIGS. 1 through 3 show a grounding wire connection device 10 of the first embodiment of the present invention.

Figure 1B:
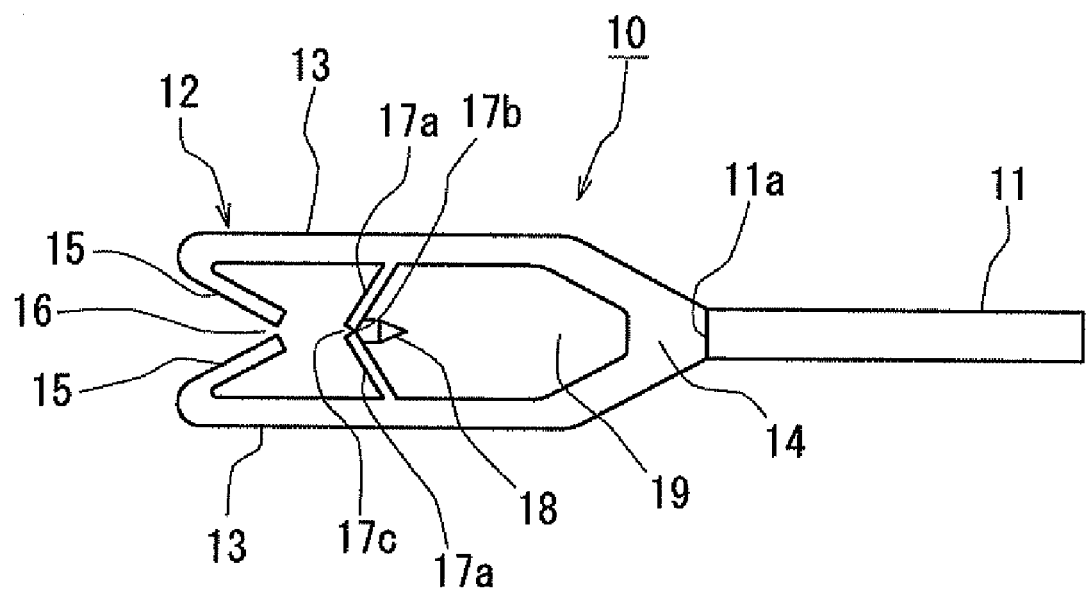

As shown in FIGS. 1(A) and 1(B), the grounding wire connection device 10 has a narrow flat plate-shaped wire harness holding plate part 11 and a grounding wire connection part 12 having a construction for conductive contact between the grounding wire 32 and the vehicle body panel 36. The grounding wire connection device 10 is formed integrally by molding a conductive resin.

The wire harness holding plate part 11 has a required length in its longitudinal direction. The width of the wire harness holding plate part 11 is almost equal to the diameter of the wire harness 30.

The grounding wire connection part 12 is projected widthwise outward from a longitudinally intermediate position of one side edge 11a of the wire harness holding plate part 11 in the width direction thereof. Thus the grounding wire connection device 10 is entirely approximately T-shaped.

The grounding wire connection part 12 has the configuration of an arrow feather in its section. In detail, the grounding wire connection part 12 has a pair of opposed pieces 13 opposed to each other in the thickness direction of the wire harness holding plate part 11. Ends of the opposed pieces 13 at one side thereof are bent in a direction in which both ends thereof approach each other and connected to each other to form a connection portion 14 continuous with the wire harness holding plate part 11. The opposed pieces 13 are bent inward and folded from ends at the other side thereof to form a pair of sandwiching pieces 15. Inner ends of a pair of the sandwiching pieces 15 are not connected to each other, but the other side of a pair of the opposed pieces 13 is formed as an open portion 16 into which the vehicle body panel 36 is inserted.

On the inner surfaces of a pair of the opposed pieces 13, there is formed a displacement portion 17 projected in the shape of V toward the open portion 16 from opposed positions of the opposed pieces 13 disposed at the side of the connection portions 14 with respect to the position of the sandwiching pieces 15 with the displacement portion 17 connecting the inner surfaces of a pair of the opposed pieces 13 to each other. A grounding wire insertion space 19 is formed between the displacement portion 17 and the connection portion 14.

In the displacement portion 17, leading ends of a pair of displacement pieces 17a pivotally projected from the opposed pieces 13 respectively are coupled to each other in the shape of V through a thin hinge portion 17b to form a central projected portion 17c. A tapered piercing portion 18 is projected toward the connection portion 14 from an inner side of the central projected portion 17c, namely, on the side thereof at the side of the connection portion 14. A base part of each of a pair of the displacement pieces 17a respectively projected from a pair of the opposed pieces 13 is deformable and formed thinly so that the displacement pieces 17a projected in the shape of V is flexible and the projected direction thereof is inverted.

A grounding wire connection operation to be performed by using the grounding wire connection device 10 is described below with reference to FIGS. 2 and 3.

Figure 2A:
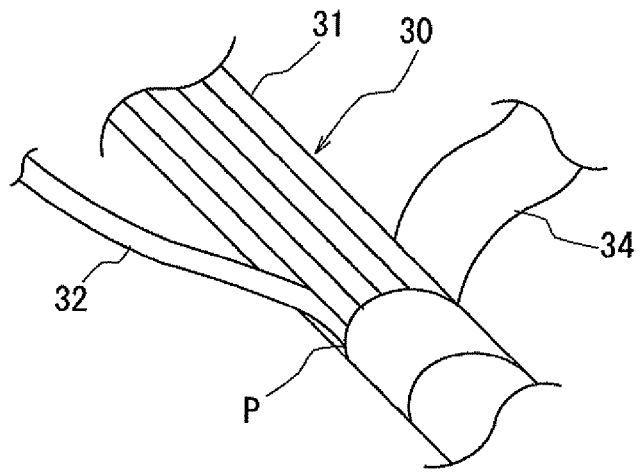
FIGS. 2(A) through 2(C) are an explanatory perspective view respectively showing the procedure of an operation of mounting the grounding wire connection device shown in FIG. 1 on a grounding wire of a wire harness.

In a tape-winding step of winding the wire harness 30 in a wire harness assembly line, as shown in FIG. 2(A), initially the grounding wire 32 bundled together with a group 31 of electric wires 31 of the wire harness 30 is drawn out of a required position of the wire harness 30 in its longitudinal direction. Thereafter a tape 34 is wound around the wire harness 30 to the root of a draw-out position P.

Figure 2B:
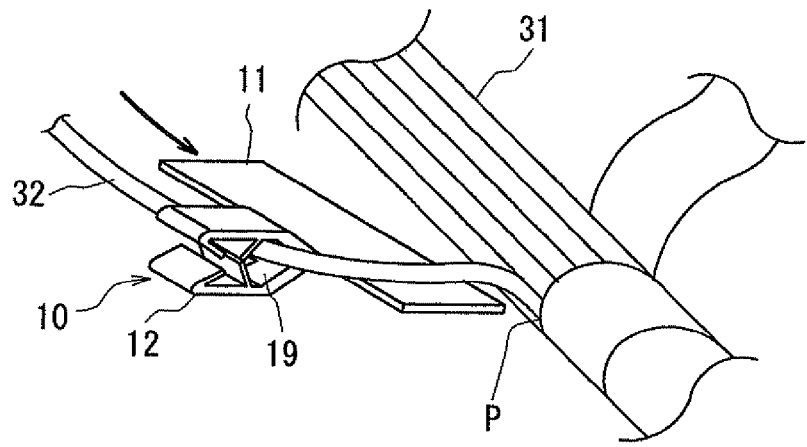

As shown in FIG. 2(B), after the grounding wire 32 is inserted into the grounding wire insertion space 19 of the grounding wire connection device 10 from a leading end thereof, the grounding wire connection device 10 is mounted on the grounding wire 32 at a portion thereof disposed in the vicinity of the draw-out position P.

Figure 2C:
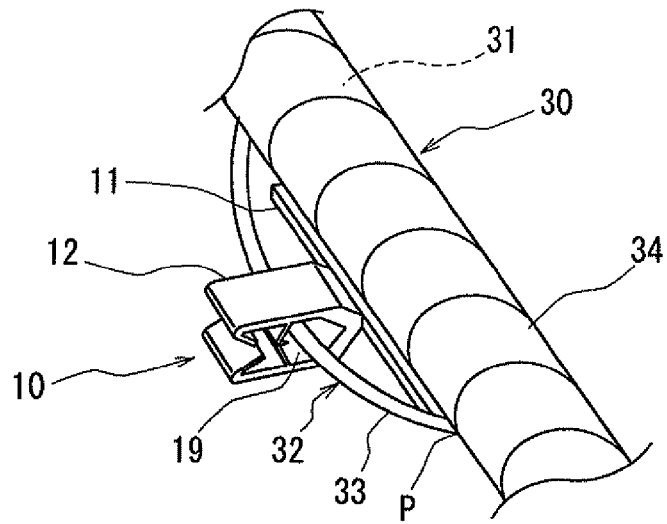

Thereafter as shown in FIG. 2(C), the tape 34 is wound around the group 31 of the electric wires from the draw-out position P toward the leading end thereof, and the grounding wire 32 is again bundled together with the group 31 of the electric wires at a position disposed at the side of the leading end of the grounding wire 32 with respect to the position where the grounding wire connection device 10 is mounted on the grounding wire 32. The tape 34 is wound around the group 31 of the electric wires and the grounding wire 32 to sheath them with the tape 34. Thereby an intermediate portion of the grounding wire 32 is exposed to the outside in the shape of a ring from the peripheral surface of the group 31 of the electric wires with the grounding wire connection device 10 being held by a ring-shaped exposed portion 33.

Figure 3A:
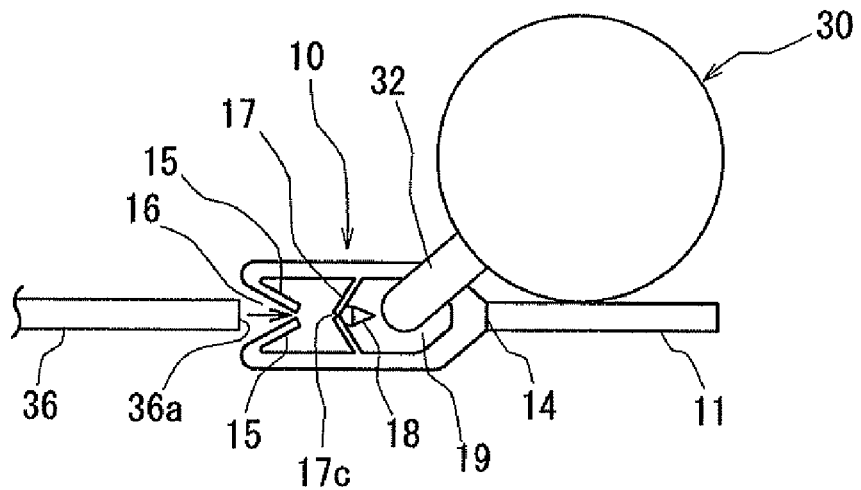
FIG. 3 shows the process of fixing of the grounding wire connection device shown in FIG. 1 to a vehicle body panel, in which (A) and (B) are a front view respectively, and (C) is a main part-enlarged sectional view of (B).

Thereafter in a vehicle assembly line of a car maker, as shown in FIG. 3(A), with the wire harness 30 placed on the upper surface of the wire harness holding plate part 11 of the grounding wire connection device 10, the grounding wire connection device 10 is inserted into an edge 36a of the vehicle body panel 36 from the open portion 16 to fix the grounding wire connection device 10 to the vehicle body panel 36.

Figure 3B:
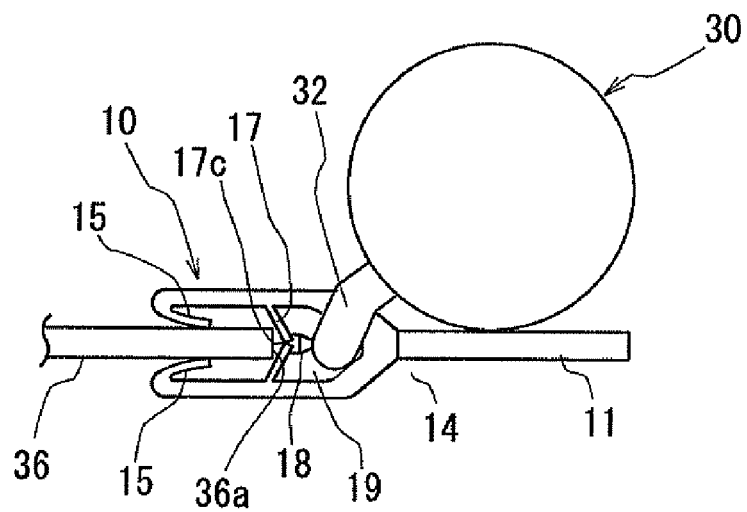

At this time, the vehicle body panel 36 is pressed into the grounding wire connection device 10 from the open portion 16. As a result, as shown in FIG. 3(B), a pair of the sandwiching pieces 15 conductively contacts the upper and lower sides of the vehicle body panel 36 respectively. At the same time, the edge 36a of the vehicle body panel 36 pressed into the grounding wire connection device 10 presses the central projected portion 17c of the displacement portion 17, thus displacing the central projected portion 17c in such a way that the central projected portion 17c is inverted and projected toward the connection portion 14.

Figure 3C:
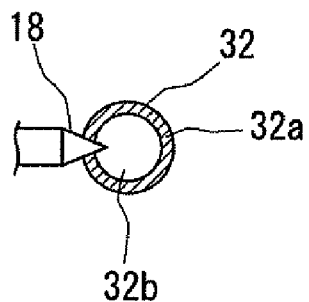

Thereby as shown in FIG. 3(C), the piercing portion 18 projected from the displacement portion 17 penetrates through an insulating sheath 32a of the grounding wire 32 inserted through the grounding wire insertion space 19, thus conductively contacting a core wire 32b.

As described above, it is possible to easily perform the operation of mounting the grounding wire connection device 10 having the above-described construction on the grounding wire 32. Further by performing a simple one-touch operation of inserting the grounding wire connection device 10 into the edge 36a of the vehicle body panel 36, it is possible to simultaneously accomplish the conductive contact between the vehicle body panel 36 and the grounding wire connection device 10 and between the grounding wire 32 and the grounding wire connection device 10. Therefore it is unnecessary to perform a hitherto required operation of stripping insulating sheaths of electric wires and a terminal-crimping operation in a wire harness-assembling line. It is also unnecessary to perform bolt hole-forming and bolt-tightening operations. Thus it is possible to achieve a dramatic operation efficiency. In addition because the use of parts such as bolts and nuts is unnecessary, it is possible to achieve cost saving and a weight decrease.

Further because a grounding wire connection position can be set at any desired necessary position of the grounding wire 32 and the wire harness 30, it is possible to enhance the degree of freedom in design and shorten the grounding wire 32.

FIG. 4 shows the second embodiment of the present invention.

In the second embodiment, instead of the piercing portion 18, a insulation displacement blade portion 20 is formed integrally with the inner side of the central projected portion 17c of the displacement portion 17 with the insulation displacement blade portion 20 projecting toward the connection portion 14.

Figure 4A:
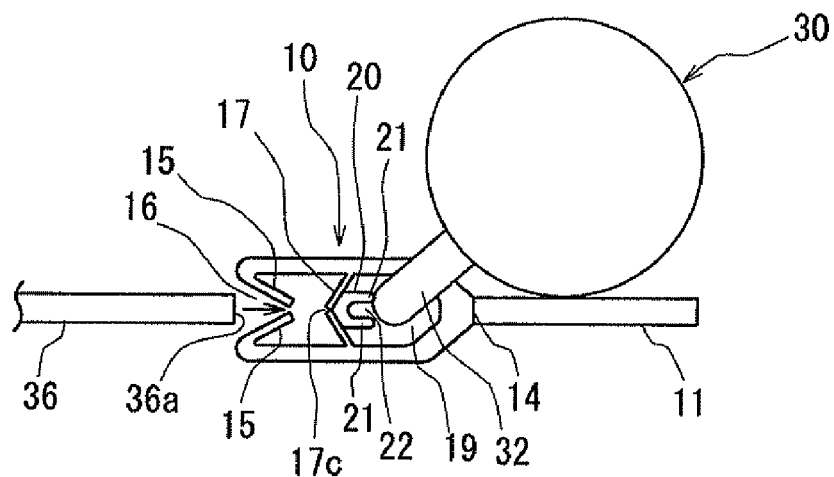
FIG. 4 shows the process of an operation of connecting a grounding wire to a vehicle body panel by using a grounding wire connection device of a second embodiment of the present invention, in which (A) and (B) are a front view respectively, and (C) is a main part-enlarged sectional view of (B).

As shown in FIG. 4(A), the insulation displacement blade portion 20 has a pair of upper and lower insulation displacement blades 21 at a leading end thereof with the insulation displacement blades 21 opposed to each other in the thickness direction of the wire harness holding plate part 11. A slot portion 22 is formed between a pair of the insulation displacement blades 21.

Similarly to the first embodiment, in the second embodiment, the grounding wire connection device 10 and the vehicle body panel 36 are allowed to be conductive with each other by inserting the grounding wire connection device 10 into the edge 36a of the vehicle body panel 36 from the open portion 16 to fix the grounding wire connection device 10 to the vehicle body panel 36 and by bringing a pair of the sandwiching pieces 15 into contact with the upper and lower sides of the vehicle body panel 36 respectively.

Figure 4B:
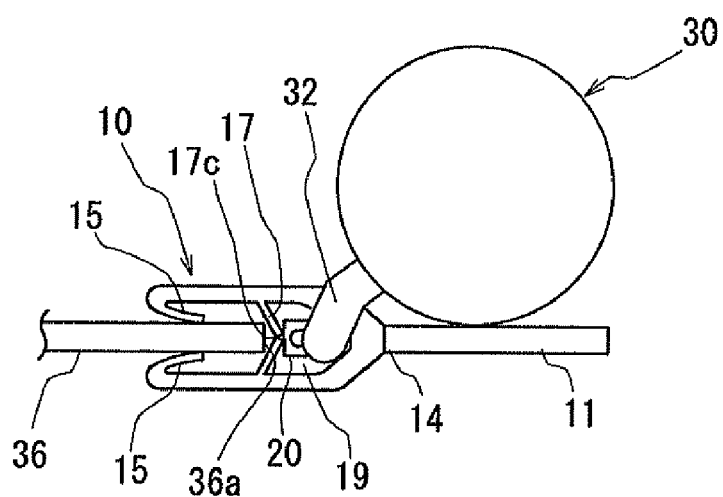
Figure 4C:
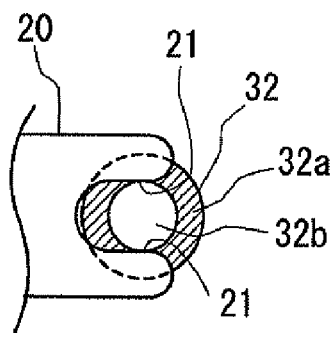
Figure 5:
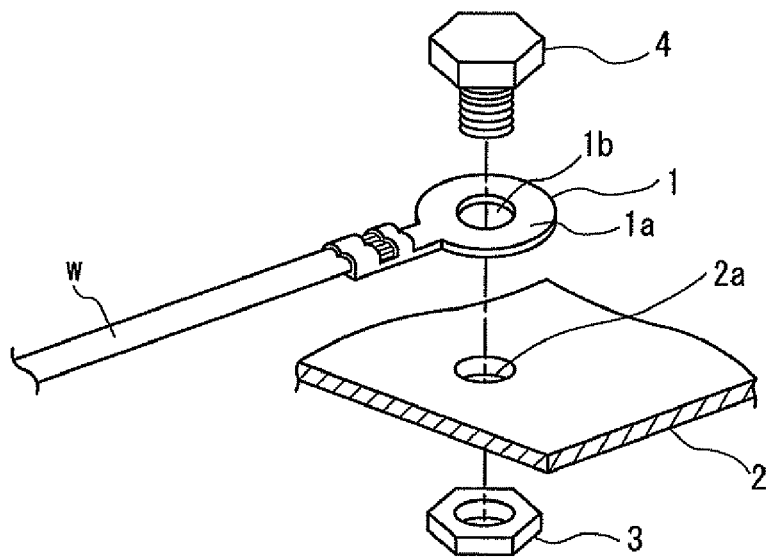
FIG. 5 shows a prior art.
Figure 6:
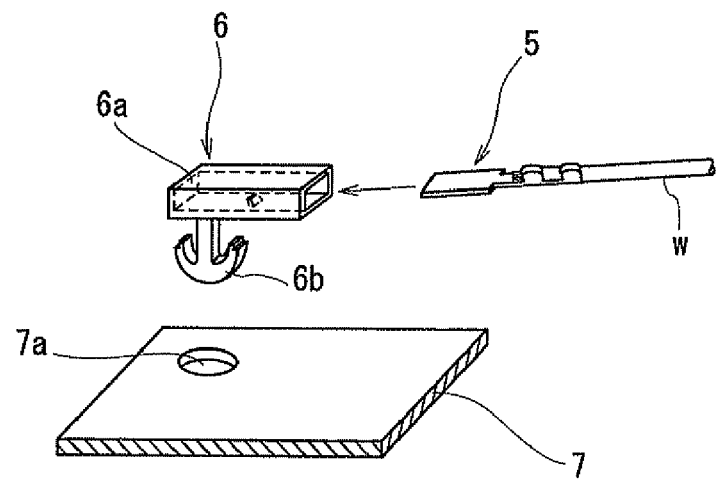
FIG. 6 shows another prior art.

As shown in FIG. 4(B), the grounding wire connection device 10 and the grounding wire 32 are conductive with each other, as described below. The edge 36a of the vehicle body panel 36 inserted into the grounding wire connection device 10 from the open portion 16 presses the central projected portion 17c of the displacement portion 17, thus displacing the central projected portion 17c in such a way that the central projected portion 17c is inverted and projected toward the connection portion 14. At this time, the insulation displacement blade portion 20 is projected into the grounding wire insertion space 19 and pressed against the surface of the grounding wire 32 inserted into the grounding wire insertion space 19. Thereby as shown in FIG. 4(C), the insulation displacement blade 21 cuts the insulating sheath 32a of the grounding wire 32 and contacts the core wire 32b.

The operation of mounting the grounding wire connection device 10 on the grounding wire 32 in the wire harness assembly line is similar to that to be performed in the first embodiment.

The present invention is not limited to the above-described embodiments. The grounding wire connection device 10 may be constructed by not providing it with the wire harness holding plate part 11, but providing it with only the grounding wire connection part 12. The wire harness 30 may be sheathed with a corrugate tube so that the grounding wire connection device 10 is mounted on the grounding wire 32 drawn out of a slit of the corrugate tube.

What is claimed is:

1. A grounding wire connection device for grounding a grounding wire provided on a wire harness wired in a vehicle to a vehicle body panel,
    said grounding wire connection device being formed integrally by molding a conductive resin, comprising:
    a pair of opposed pieces;
    a connection portion formed by connecting ends of said opposed pieces at one side thereof to each other;
    a pair of sandwiching pieces formed by inward bending and folding said opposed pieces at an open side disposed at the other side of said opposed pieces from ends of said opposed pieces;
    a displacement portion which is flexible and disposed at a side of said connection portion with respect to a position of said sandwiching pieces by projecting said displacement portion in a shape of V from a pair of said opposed pieces toward said open side, with said displacement portion connecting inner surfaces of a pair of said opposed pieces to each other;
    a piercing portion projected from a central projected portion of said displacement portion toward said connection portion; and
    a grounding wire insertion space formed between said piercing portion and said connection portion,
    wherein said grounding wire is inserted through said grounding wire insertion space; said grounding wire connection device is mounted on said vehicle body panel by attaching said grounding wire connection device on an edge of said vehicle body panel from said open side thereof and bringing a pair of said sandwiching pieces into contact with upper and lower sides of said vehicle body panel respectively; said displacement portion projected in said shape of V is pressed to displace said displacement portion in such a way that said displacement portion is inverted and projected toward said connection portion by means of an insertion force of said vehicle body panel; and said piercing portion projected from said displacement portion penetrates through an insulating sheath of said grounding wire and contacts a core wire thereof.

2. A grounding wire connection device according to claim 1, wherein said grounding wire is bundled together with a group of electric wires of said wire harness; an intermediate portion of said grounding wire is exposed to the outside by forming a gap between said grounding wire and a peripheral surface of said wire harness; and said grounding wire is held by said wire harness in advance by inserting said intermediate portion thereof through said grounding wire insertion space.

3. A grounding wire connection device for connecting a grounding wire provided on a wire harness wired in a vehicle to a vehicle body panel, said grounding wire connection device being formed integrally by molding a conductive resin, comprising:
a pair of opposed pieces;
a connection portion formed by connecting ends of said opposed pieces at one side thereof to each other;
a pair of sandwiching pieces formed by inward bending and folding said opposed pieces at an open side disposed at the other side of said opposed pieces from ends of said opposed pieces;
a displacement portion which is flexible and disposed at a side of said connection portion with respect to a position of said sandwiching pieces by projecting said displacement portion in a shape of V from a pair of said opposed pieces toward said open side, with said displacement portion connecting inner surfaces of a pair of said opposed pieces to each other;
a insulation displacement blade portion projected from a central projected portion of said displacement portion toward said connection portion; and
a grounding wire insertion space formed between said insulation displacement blade portion and said connection portion,
wherein said grounding wire is inserted through said grounding wire insertion space; said grounding wire connection device is mounted on said vehicle body panel by attaching said grounding wire connection device on an edge of said vehicle body panel from said open side thereof and bringing a pair of said sandwiching pieces into contact with upper and lower sides of said vehicle body panel respectively; said displacement portion projected in said shape of V is pressed to displace said displacement portion in such a way that said displacement portion is inverted and projected toward said connection portion by means of an insertion force of said vehicle body panel; and said insulation displacement blade portion projected from said displacement portion cuts an insulating sheath of said grounding wire and contacts a core wire thereof.

4. The grounding wire connection device according to claim 3, wherein said grounding wire is bundled together with a group of electric wires of said wire harness; an intermediate portion of said grounding wire is exposed to the outside by forming a gap between said grounding wire and a peripheral surface of said wire harness; and said grounding wire is held by said wire harness in advance by inserting said intermediate portion thereof through said grounding wire insertion space.

* * * * *